(12) United States Patent
Fujita

(10) Patent No.: US 11,099,471 B2
(45) Date of Patent: Aug. 24, 2021

(54) IMAGE DISPLAY APPARATUS

(71) Applicant: SONY CORPORATION, Tokyo (JP)

(72) Inventor: Keiko Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/767,436

(22) PCT Filed: Sep. 19, 2018

(86) PCT No.: PCT/JP2018/034646
§ 371 (c)(1),
(2) Date: May 27, 2020

(87) PCT Pub. No.: WO2019/111492
PCT Pub. Date: Jun. 13, 2019

(65) Prior Publication Data
US 2020/0371419 A1  Nov. 26, 2020

(30) Foreign Application Priority Data
Dec. 4, 2017 (JP) .............................. JP2017-232586

(51) Int. Cl.
*G03B 21/20* (2006.01)
*G03B 33/12* (2006.01)
*G03B 21/16* (2006.01)

(52) U.S. Cl.
CPC ......... *G03B 21/2053* (2013.01); *G03B 21/16* (2013.01); *G03B 33/12* (2013.01)

(58) Field of Classification Search
None
See application file for complete search history.

(56) References Cited

U.S. PATENT DOCUMENTS

2005/0110958 A1\* 5/2005 Schwartz ........... G03B 21/2053
353/85

FOREIGN PATENT DOCUMENTS

| JP | 6-259030 A | 9/1994 |
|---|---|---|
| JP | 2005-17547 A | 1/2005 |
| JP | 2007-286550 A | 11/2007 |
| JP | 2012-249163 A | 12/2012 |
| JP | 2012249163 A * | 12/2012 |

(Continued)

OTHER PUBLICATIONS

International Search Report dated Dec. 11, 2018 in PCT/JP2018/034646 filed on Sep. 19, 2018, 2 pages.

*Primary Examiner* — Michelle M Iacoletti
*Assistant Examiner* — Danell L Owens
(74) *Attorney, Agent, or Firm* — Oblon, McClelland, Maier & Neustadt, L.L.P.

(57) ABSTRACT

An image display apparatus according to an embodiment of the present technology includes a light source section, a first sensor, a second sensor, and a light source control section. The light source section emits emitted light. The first sensor is arranged in a first region and is capable of detecting a state of the emitted light. The second sensor is arranged in a second region and is capable of detecting the state of the emitted light, the second region being less influenced by dust than the first region. The light source control section is capable of controlling the light source section according to a first detection result of detection performed by the first sensor, and a second detection result of detection performed by the second sensor.

15 Claims, 9 Drawing Sheets

(56) References Cited

FOREIGN PATENT DOCUMENTS

| JP | 2015-79208 A | 4/2015 |
|---|---|---|
| WO | WO 2013/080282 A1 | 6/2013 |
| WO | WO 2017/175467 A1 | 10/2017 |

* cited by examiner

IMAGE DISPLAY APPARATUS

TECHNICAL FIELD

The present technology relates to an image display apparatus such as a projector.

BACKGROUND ART

Conventionally, an image display apparatus such as a projector has been widely used. For example, light from a light source is modulated by a light modulator such as a liquid crystal element, and the modulated light is projected onto, for example, a screen so that an image is displayed on the screen. For example, a mercury lamp, a xenon lamp, a light emitting diode (LED), or a laser diode (LD) is used as the light source. From among the light sources, a solid-state light source such as an LED or an LD has a long life and thus there is no need for a lamp change performed in the past. Further, the solid-state light source also has the advantage of being lighted immediately after the power is turned on.

Patent Literature 1 discloses an image display apparatus that includes three liquid crystal display units that respectively modulate pieces of light of colors that are red, green, and blue, and a light synthesizer unit that synthesizes the pieces of modulated light (pieces of image light) of the respective colors that are red, green, and blue. In the image display apparatus, a sensor is arranged in a light path of diffracted light of the modulated light emitted from the liquid crystal display unit, the diffracted light having a predetermined order. Sensing of the diffracted light by use of the sensor makes it possible to perform calibration with a simple structure and with a high degree of accuracy with respect to, for example, white balance and brightness. (for example, paragraphs [0031], [0033], [0082], and [0083] in the specification and FIG. 2 of Patent Literature 1).

CITATION LIST

Patent Literature

Patent Literature 1: Japanese Patent Application Laid-open No. 2015-79208

DISCLOSURE OF INVENTION

Technical Problem

In an image display apparatus such as a projector, there may be a decrease in brightness due to, for example, light source degradation caused by aging. In order to prevent such a problem, a technology is desired that makes it possible to control a light source accurately.

In view of the circumstances described above, it is an object of the present technology to provide an image display apparatus that makes it possible to control a light source accurately.

Solution to Problem

In order to achieve the object described above, an image display apparatus according to an embodiment of the present technology includes a light source section, a first sensor, a second sensor, and a light source control section.

The light source section emits emitted light.

The first sensor is arranged in a first region and is capable of detecting a state of the emitted light.

The second sensor is arranged in a second region and is capable of detecting the state of the emitted light, the second region being less influenced by dust than the first region.

The light source control section is capable of controlling the light source section according to a first detection result of detection performed by the first sensor, and a second detection result of detection performed by the second sensor.

In the image display apparatus, the first sensor is arranged in the first region, and the second sensor is arranged in the second region less influenced by dust than the first region. It is possible to accurately control the light source section using respective detection results of the first and second sensors.

The second region may be a region in which an amount of dust is smaller than an amount of dust in the first region.

The image display apparatus may further include a housing that includes an inlet used to intake outside air. In this case, the first region may be provided in a flow passage of the outside air intaken from the inlet, or near the flow passage of the outside air. Further, the second region may be provided at a position away from the flow passage of the outside air.

The second region may be provided in a hermetically sealed space, or in a space into which entrance of the outside air is restricted.

The light source control section may control the light source section such that intensity of the emitted light emitted from the light source section is maintained constant.

The light source section may include at least one light source that is driven by being supplied with current. In this case, according to the first detection result and the second detection result, the light source control section may control the current supplied to the at least one light source.

The image display apparatus may further include a storage that stores therein first reference information regarding the first sensor and second reference information regarding the second sensor. In this case, the light source control section may control the light source section according to the first detection result, the second detection result, the stored first reference information, and the stored second reference information.

The light source control section may control the light source section according to a correlation between the first reference information and the second reference information, and a correlation between the first detection result and the second detection result.

The first reference information may be a detection result detected by the first sensor when the emitted light in a reference state is emitted. In this case, the second reference information may be a detection result detected by the second sensor when the emitted light in the reference state is emitted.

The light source control section may correct the first detection result according to the first detection result, the second detection result, the stored first reference information, and the stored second reference information.

According to the corrected first detection result, the light source control section may control the current supplied to the at least one light source.

According to the second detection result, the light source control section may control the current supplied to the at least one light source.

The light source section may include at least one light source and a light emitter, the light emitter being excited by light emitted from the at least one light source and emitting visible light, and may emit, as the emitted light, light that includes the light from the at least one light source and the visible light from the light emitter.

The light source section may include a hermetically sealed portion that includes a window and has a hermetically sealed space formed inside the hermetically sealed portion. In this case, the light emitter may be arranged in the hermetically sealed space. Further, the second sensor may be arranged to face the window of the hermetically sealed portion.

The image display apparatus may further include an image generator and a projection section.

The image generator generates an image using the emitted light emitted from the light source section.

The projection section projects the image generated by the image generator.

Advantageous Effects of Invention

As described above, the present technology makes it possible to control a light source accurately. Note that the effect described here is not necessarily limitative and may be any effect described in the present disclosure.

MODE(S) FOR CARRYING OUT THE INVENTION

Embodiments according to the present technology will now be described below with reference to the drawings.

[Image Display Apparatus]

Figure 1:
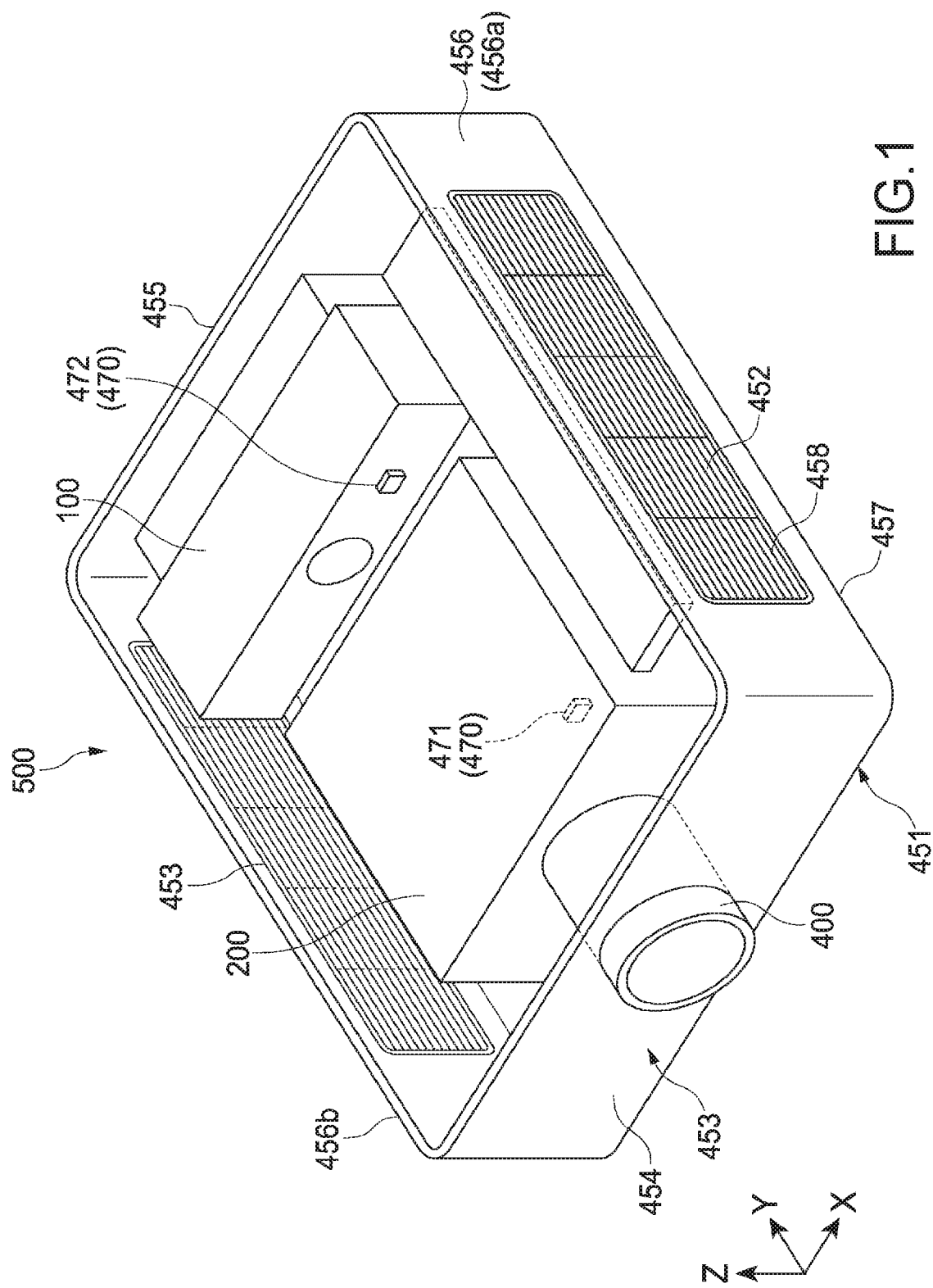
FIG. 1 schematically illustrates an example of a configuration of an image display apparatus according to an embodiment.

FIG. 1 schematically illustrates an example of a configuration of an image display apparatus according to an embodiment of the present technology. In the following descriptions, a left-right direction, a front-rear direction, and a height direction of an image display apparatus 500 are respectively referred to as an X direction, a Y direction, and a Z direction. Of course, the directions are not limited to being set as described above.

For example, the image display apparatus 500 is used as a projector for presentation or for digital cinema. The present technology described below is applicable to any image display apparatus used for other purposes.

The image display apparatus 500 includes a light source section 100, an image generator 200, a projection section 400, a housing 450, and a sensor mechanism 470.

The light source section 100 emits emitted light to the image generator 200. The image generator 200 generates an image using the emitted light emitted from the light source section 100. The projection section 400 projects the image generated by the image generator 200 onto, for example, a screen.

The housing 450 includes an outer frame 451, an inlet 452, and an outlet 453. The outer frame 451 is configured to surround the light source section 100, the image generator 200, and the projection section 400. The outer frame 451 has a shape of a substantially rectangular parallelepiped, and includes a front face 454, a rear face 455, side faces 456, a bottom face 457, and a top face. Note that, in FIG. 1, an illustration of the top face is omitted.

Of two side faces 456a and 456b of the outer frame 451, the inlet 452 is formed on the side face 456a that is one of the two side faces 456a and 456b, and is used to intake outside air. The outlet 453 is formed on the side face 456b that is the other side of the two side faces 456a and 456b, and is used to emit the air intaken from the inlet 452. In the present embodiment, the inlet 452 and the outlet 453 are each formed into a rectangular shape that extends in the front-rear direction (the Y direction) from the front face 454 to the rear face 455.

Outside air is intaken from the inlet 452 as cooling air, and is supplied to the inside of the image display apparatus 500. The air cools the inside of the image display apparatus 500, becomes warm, and is emitted to the outside from the outlet 453. A fan mechanism or the like may be provided near the inlet 452 or near the outlet 453 so that the outside air flows efficiently through the image display apparatus 500.

The sensor mechanism 470 includes a first sensor 471 and a second sensor 472. The first sensor 471 is arranged in the image generator 200. The second sensor 472 is arranged near the light source section 100. The first and second sensors 471 and 472 are capable of detecting a state of emitted light emitted from the light source section 100. In the present embodiment, the intensity (brightness) of emitted light is detected as a state of the emitted light.

The specific configurations of the first and second sensors 471 and 472 are not limited, and any brightness sensor may be used. Of course, an array sensor including a plurality of sensors, or an image sensor such as a CMOS sensor or a CCD sensor may be used.

Note that detecting a state of light includes any method that makes it possible to detect a state of detection-target light. For example, the detecting a state of light also includes a method for detecting a state of a portion of light included in the detection-target light, and a method for detecting a state of leaked light or diffracted light of the detection-target light.

Figure 2:
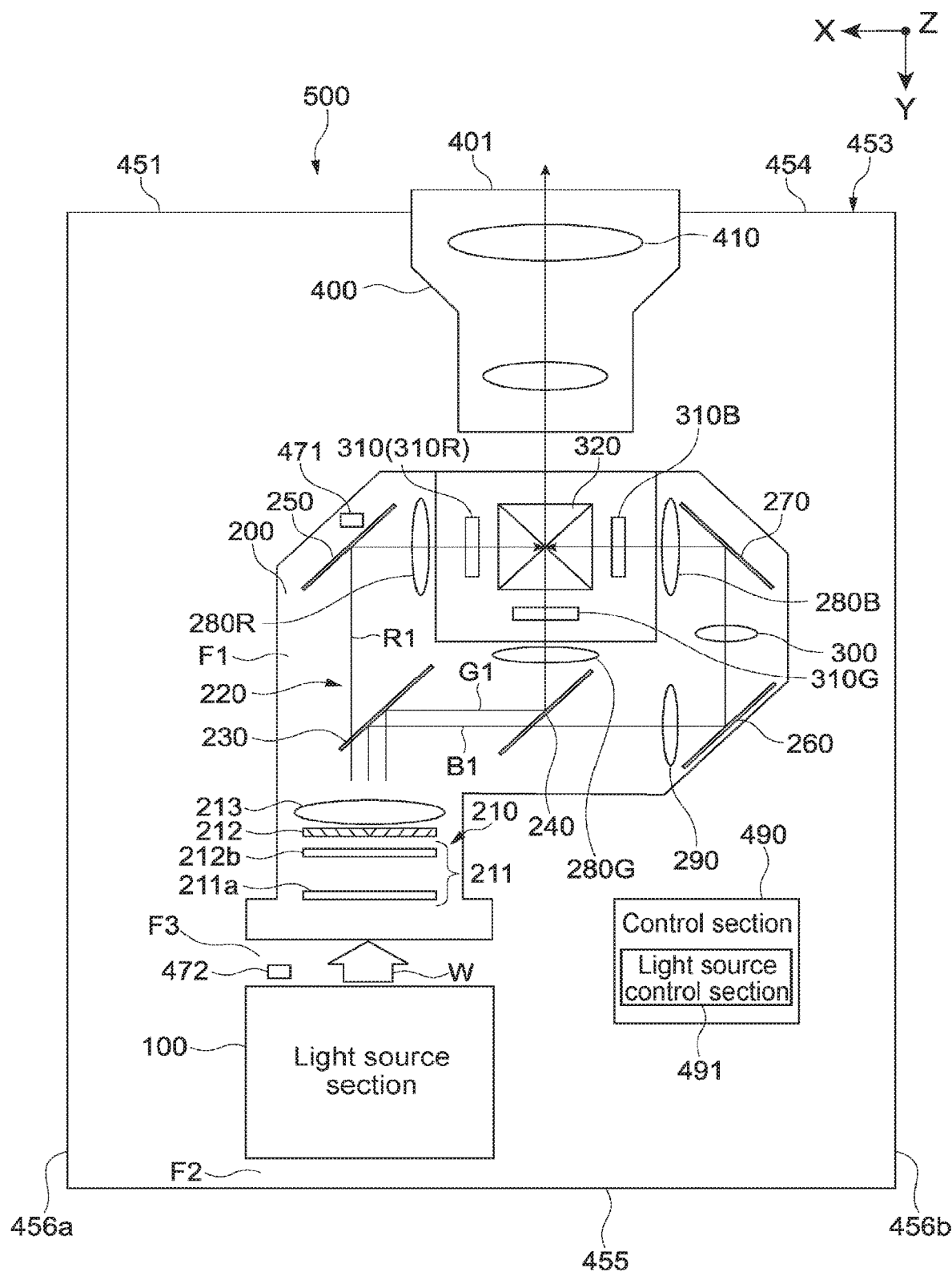
FIG. 2 schematically illustrates an example of a configuration of an image generator and a projection section.

Further, the image display apparatus 500 includes a controller (a control section) 490 that controls an overall operation of the image display apparatus 500 (refer to FIG. 2). The controller 490 has a hardware configuration including, for example, a CPU and a memory (a RAM and a ROM) that are necessary for a computer. Various processes are performed by the CPU loading, into the RAM, a control program stored in, for example, a memory and executing the program.

For example, a programmable logic device (PLD) such as a field programmable gate array (FPGA) or another device such as an application specific integrated circuit (ASIC) may be used as the controller 490. Further, the position at which the controller 490 is arranged, and the like are also not limited, and the arrangement and the like may be designed as appropriate.

In the present embodiment, a light source control section 491 is implemented by the CPU of the controller 490 executing a specified program (refer to FIG. 2). In order to implement the light source control section 491, dedicated hardware such as an integrated circuit (IC) may be used as appropriate. Further, in the present embodiment, a storage is implemented by, for example, the memory of the controller 490. Of course, the storage including, for example, a ROM or an HDD may be provided independently of the controller 490.

FIG. 2 schematically illustrates an example of a configuration of the image generator 200 and the projection section 400. As illustrated in FIG. 2, the light source section 100, the image generator 200, and the projection section 400 are arranged from the rear face 455 to the front face 454 of the outer frame 451. The projection section 400 is arranged such that an exit surface 401 of the projection section 400 protrudes outward from the front face 454.

In the present embodiment, white light W including red light, green light, and blue light is emitted by the light source section 100 as emitted light. Further, an image is generated by the image generator 200 using the white light W emitted from the light source section 100.

The image generator 200 includes an integrator optical system 210 and an illumination optical system 220. The integrator optical system 210 includes an integrator element 211, a polarization conversion element 212, and a condenser lens 213.

The integrator element 211 includes a first fly eye lens 211a and a second fly eye lens 211b, the first fly eye lens 211a including a plurality of two-dimensionally arranged microlenses, the second fly eye lens 211b including a plurality of microlenses arranged to each correspond to a respective one of the plurality of two-dimensionally arranged microlenses included in the first fly eye lens 211a.

The white light W having entered the integrator element 211 is split into a plurality of light beams by the microlenses of the first fly eye lens 211a, and images of the light beams obtained by the split are respectively formed on the corresponding microlenses provided to the second fly eye lens 211b. The microlenses provided to the second fly eye lens 211b each serve as a secondary light source, and the integrator element 211 emits a plurality of collimated beams of a uniform brightness to the polarization conversion element 212 situated at the output side of the integrator element 211.

The polarization conversion element 212 includes a function that maintains a polarization state of incident light that enters through the integrator element 211. The light that has passed through the polarization conversion element 212 is emitted to the illumination optical system 220 through the condenser lens 213.

The integrator optical system 210 includes, as a whole, a function that performs adjustment such that the white light W directed to the illumination optical system 220 has a distribution of uniform brightness so that the white light W is adjusted to light in a maintained polarization state. The specific configuration of the integrator optical system 210 is not limited.

The illumination optical system 220 includes dichroic mirrors 230, 240, 250, 260, and 270, field lenses 280R, 280G, and 280B, relay lenses 290 and 300, liquid crystal light valves 310R, 310G, and 310B, and a dichroic prism 320, the liquid crystal light valves 310R, 310G, and 310B serving as an image generation element.

The dichroic mirrors 230 to 270 have the characteristics in that colored light of a specified wavelength band is selectively reflected off each of the dichroic mirrors 230 to 270, and light of a wavelength band that is other than the light of the specified wavelength band is transmitted through the dichroic mirror. Green light G1 and blue light B1 that are included in white light W are selectively reflected off the dichroic mirror 230, and red light R1 included in the white light W is transmitted through the dichroic mirror 230.

The green light G1 reflected off the dichroic mirror 230 is selectively reflected off the dichroic mirror 240, and the blue light B reflected off the dichroic mirror 230 is transmitted through the dichroic mirror 240. Accordingly, light is split into pieces of light of different colors to be guided to different light paths. Note that a configuration for splitting light into pieces of light of respective colors that are red, green, and blue, and a used device are not limited.

The red light R1 obtained by the split is reflected off the dichroic mirror 250, is collimated by the field lens 280R, and then enters the liquid crystal light valve 310R for modulating red light. The green light G1 is collimated by the field lens 280G, and then enters the liquid crystal light valve 310G for modulating green light.

The blue light B1 passes through the relay lens 290 to be reflected off the dichroic mirror 260, and further passes through the relay lens 300 to be reflected off the dichroic mirror 270. The blue light B1 reflected off the dichroic mirror 270 is collimated by the field lens 280B, and then enters the liquid crystal light valve 310B for modulating blue light.

The liquid crystal light valves 310R, 310G, and 310B are electrically connected to a signal source (such as a PC) that is not illustrated and provides an image signal that includes image information. The liquid crystal light valves 310R, 310G, and 310B modulate incident light for each pixel according to provided image signals of respective colors, and respectively generate a red image, a green image, and a blue image. The pieces of modulated light of the respective colors (formed images) enter the dichroic prism 320, and are combined. The dichroic prism 320 superimposes the pieces of light of the respective colors that respectively enter from three directions to combine these pieces of light, and emits the combined pieces of light to the projection section 400.

The projection section 400 projects an image generated by the image generator 200. The projection section 400 includes, for example, a plurality of lenses 410, and projects, onto a screen or the like (not illustrated), light obtained by the combining performed by the dichroic prism 320. Accordingly, a full-color image is displayed. The specific configuration of the projection section 400 is not limited.

Figure 3:
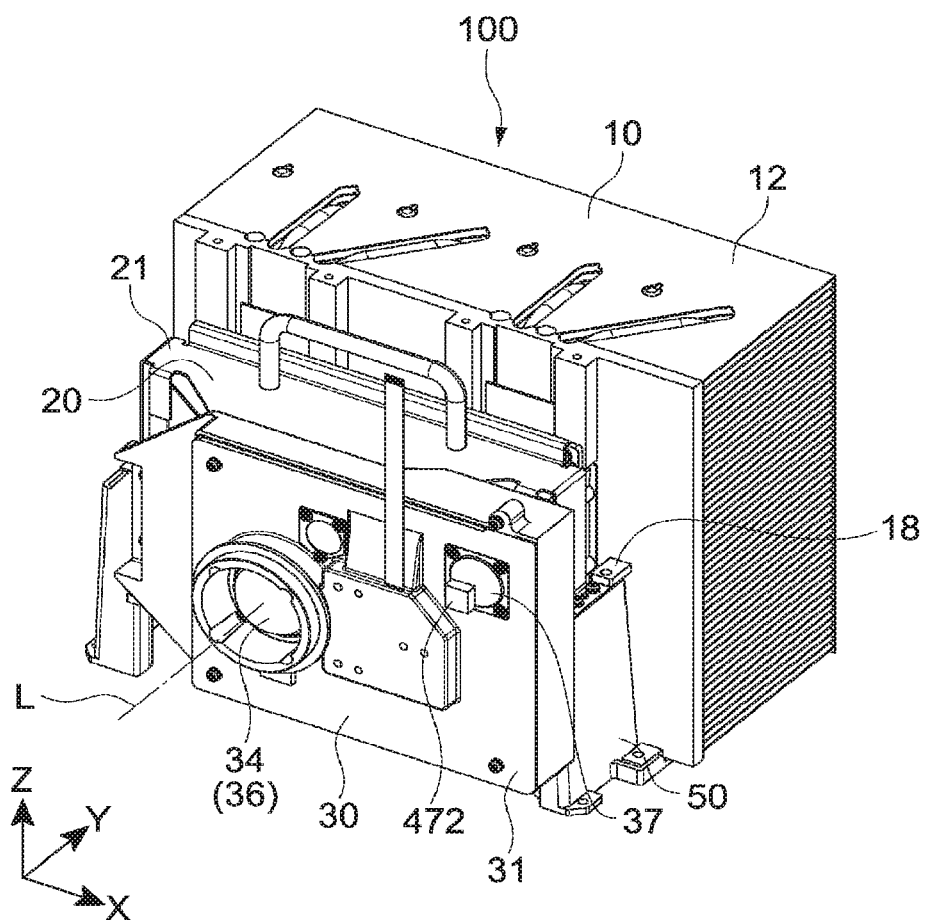
FIG. 3 is a perspective view of an example of a configuration of a light source section.
Figure 4:
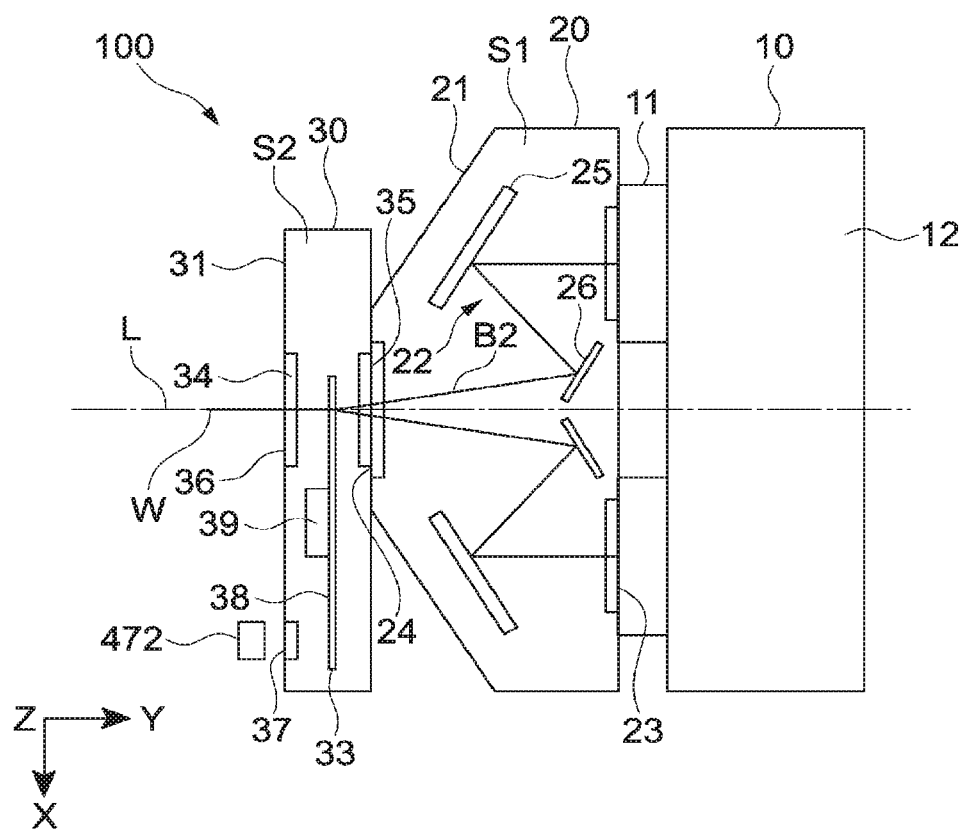
FIG. 4 schematically illustrates an example of an inside configuration of the light source section.

FIG. 3 is a perspective view of an example of a configuration of the light source section 100. FIG. 4 schematically illustrates an example of an inside configuration of the light source section 100. The light source section 100 includes a light source unit 10, an optical system unit 20, a phosphor unit 30, and a base 50 that supports the light source unit 10, the optical system unit 20, and the phosphor unit 30.

It is assumed that the side from which white light W is emitted is a front side, and the opposite side is a rear side. The light source unit 10, the optical system unit 20, and the phosphor unit 30 are supported by the base 50 to be arranged in this order from the rear side to the front side. Note that an illustration of the base 50 is omitted in FIG. 4.

The base 50 has an elongated shape extending in the left-right direction (the X direction). A support mechanism for supporting the light source unit 10, the optical system unit 20, and the phosphor unit 30 is provided to the base 50.

The specific configuration of the support mechanism is not limited, and the support mechanism may be designed discretionarily.

Figure 5:
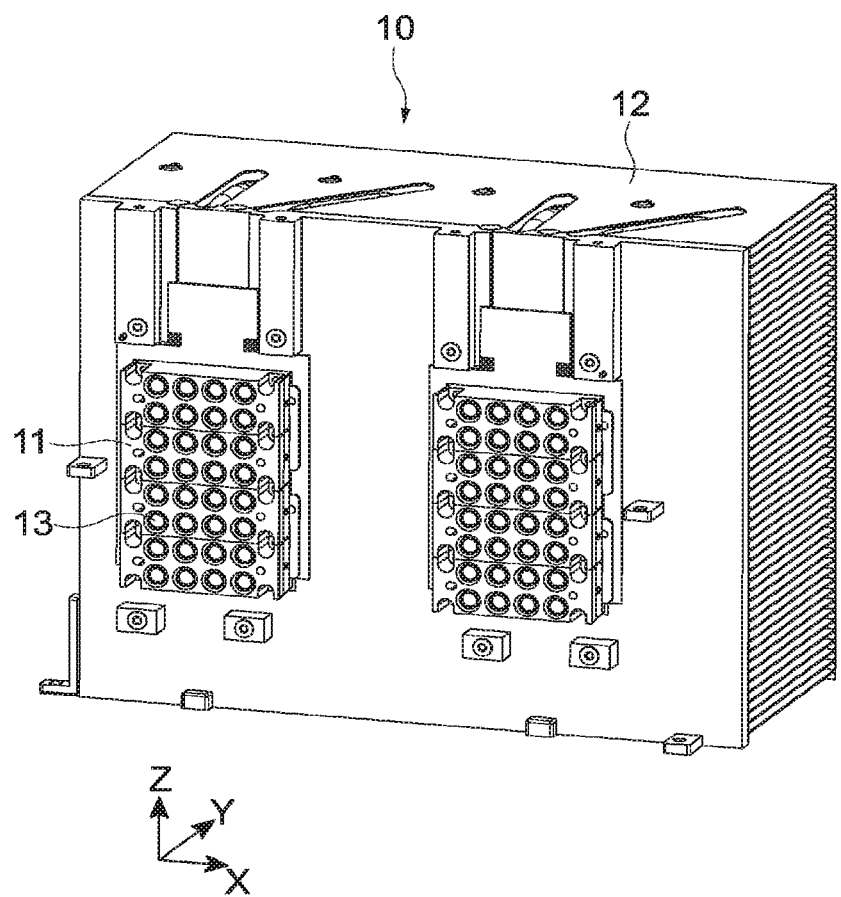
FIG. 5 is a perspective view of an example of a configuration of a light source unit.

FIG. 5 is a perspective view of an example of a configuration of the light source unit 10. As illustrated in FIGS. 4 and 5, the light source unit 10 includes two light source blocks 11 that are arranged in the X direction, and a heat sink 12 that is arranged behind the two light source blocks 11, the two light source blocks 11 and the heat sink 12 being configured as a unit.

Each light source block 11 includes a plurality of laser light sources (laser diodes) 13 driven by being supplied with current. The plurality of laser light sources 13 is arranged such that laser light is emitted toward the front side, where the front-rear direction is an optical-axis direction.

In the present embodiment, for example, a blue laser light source is used as the plurality of laser light sources 13, the blue laser light source being capable of emitting blue laser light B2 having a peak wavelength of emission intensity in a wavelength range between 400 nm and 500 nm. In the present embodiment, the plurality of laser light sources 13 corresponds to at least one light source.

Another solid-state light source such as an LED may be used as the at least one light source. Further, the present technology is also applicable when a mercury lamp, a xenon lamp, or the like is used. Furthermore, the wavelength band of emitted light is also not limited, and may be set discretionarily.

As illustrated in FIG. 4, the optical system unit 20 includes a housing 21 in which a hermetically sealed space S1 is formed, and a light collection optical system 22 that is accommodated in the hermetically sealed space S1. Two entrance apertures 23 are each formed at a position on a rear-side surface of the housing 21, the entrance aperture 23 being an aperture that the blue laser light B2 enters, the position facing the light source block 11. An exit aperture 24 is formed on a front-side surface of the housing 21, the exit aperture 24 being an aperture from which the blue laser light B2 collected by the light collection optical system 22 is emitted.

The two entrance apertures 23 and the exit aperture 24 are hermetically sealed with any transparent member such as glass or plastic. Note that the hermetically sealed space S1 may be provided by the entrance apertures 23 being opened and connected to the light source unit 10 and by the exit aperture 24 being opened and connected to the phosphor unit 30.

The light collection optical system 22 includes two aspheric mirrors 25 (illustrated in the form of a plate in the figure) and two flat mirrors 26. The blue laser light B2 that enters the entrance aperture 23 in the front-rear direction is reflected off the aspheric mirror 25 to be collected. The light reflected off the aspheric mirror 25 is reflected off the flat mirror 26 to be directed to the exit aperture 24. The configuration of the light collection optical system 22 is not limited, and any configuration may be adopted.

The phosphor unit 30 includes a housing 31 in which a hermetically sealed space S2 is formed, and a wheel section 33 that is accommodated in the hermetically sealed space S2, and an exit lens 34. An entrance aperture 35 is formed on a rear-side surface of the housing 31, the entrance aperture 35 being an aperture that the blue laser light B2 emitted from the exit aperture 24 of the optical system unit 20 enters. An exit aperture 36 is formed on a front-side surface of the housing 31, the exit aperture 36 being an aperture from which white light W is emitted. The exit aperture 36 is hermetically sealed with the exit lens 34.

Further, a window 37 is formed on the front-side surface of the housing 31. The entrance aperture 35 and the window 37 are hermetically sealed with a transparent member made of, for example, glass or plastic. In the present embodiment, the housing 31 serves as a hermetically sealed portion that includes a window and has a hermetically sealed space formed inside the hermetically sealed portion. Note that the hermetically sealed space S2 may be provided by the entrance aperture 35 being opened and connected to the optical system unit 20. In this case, the hermetically sealed portion is provided by the housings 31 and 21.

The wheel section 33 includes a phosphor wheel 38 and a motor 39. The phosphor wheel 38 is positioned so that the blue laser light B2 entering the entrance aperture 35 is collected at a specified point. The motor 39 is driven by electrical power supplied through, for example, a flexible printed circuit, and rotates the phosphor wheel 38.

Figure 6:
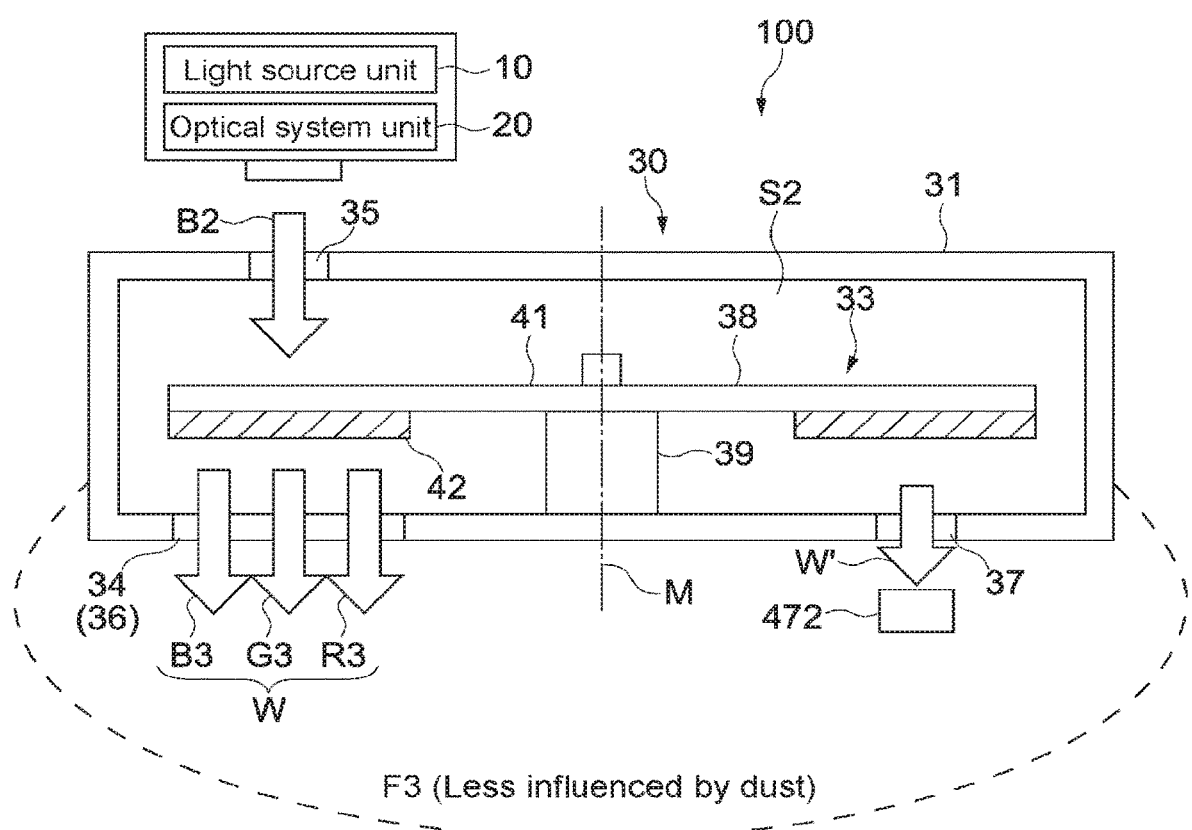
FIG. 6 is a diagram describing generation of white light W that is performed by a phosphor unit.

FIG. 6 is a diagram describing generation of white light W that is performed by the phosphor unit 30. The phosphor wheel 38 includes a disk-shaped substrate 41 through which blue laser light B2 is transmitted, and a phosphor layer 42 provided on the substrate 41. A crystalline member made of, for example, rock crystal or sapphire is used as the substrate 41.

The phosphor layer 42 includes a fluorescent substance that is excited by blue laser light B2 emitted by the plurality of laser light sources 13 and emits visible light. In the present embodiment, a portion of the blue laser light B2 is converted, by the phosphor layer 42, into light of a wavelength band including bands from a red wavelength to a green wavelength (that is, yellow light). Further, the portion of the blue laser light B2 is transmitted through the phosphor layer 42 without a change. Thus, light including the blue excitation light and the yellow fluorescence is emitted from the phosphor layer 42.

For example, an yttrium aluminum garnet (YAG) phosphor is used as the fluorescent substance included in the phosphor layer 42. Note that the type of the fluorescent substance, the wavelength band of the excitation light, and the wavelength band of the visible light generated by performing excitation are not limited.

In the present embodiment, the phosphor layer 42 corresponds to a light emitter that is excited by blue laser light B2 emitted from the plurality of laser light sources 13 and emits visible light. Any other substance different from a phosphor may be used as the light emitter.

The motor 39 is connected to a center portion of the substrate 41. The phosphor wheel 38 rotates about a rotation axis M by the motor 39 being driven.

Blue laser light B2 is emitted from the light source unit 10 in a state in which the substrate 41 is being rotated by the motor 39. The blue laser light B2 is collected by the optical system unit 20 and irradiated onto the phosphor layer 42 through the entrance aperture 35. The blue laser light B2 is irradiated onto the phosphor layer 42 in a relatively circular motion following the rotation of the substrate 41.

Accordingly, as illustrated in FIG. 6, white light W that includes blue laser light B3, green light G3, and red light R3 is emitted, the blue laser light B3 being transmitted through the phosphor layer 42, the green light G3 and the red light R3 being visible light from the phosphor layer 42. The white light W is emitted through the exit lens 34 (the exit aperture 36) along an optical axis L illustrated in FIGS. 3 and 4. In the present embodiment, the white light W corresponds to light that includes light from the plurality of laser light sources 13 and visible light from the phosphor layer 42.

Note that a configuration and a method for connecting each unit to the base 50, and a configuration and a method for connecting the respective units to one another are not limited, and any configuration and any method such as fitting, bonding, or screw clamp may be adopted.

[Cooling Structure (Influence of Dust)]

As described with reference to FIG. 1, in the present embodiment, outside air is intaken from the inlet 452 as cooling air, and is supplied to the inside of the image display apparatus 500. The intaken outside air cools the image generator 200 and the light source section 100, and is emitted to the outside from the outlet 453.

A cooling structure for properly forming a flow passage of outside air is included inside the image display apparatus 500. For example, the cooling structure is implemented by using any member for directing air, such as a duct. Further, it is possible to implement any cooling structure, for example, due to the position of each mechanism or by forming, in each mechanism, an opening, a hole, or the like through which air passes.

In the present embodiment, a cooling structure is configured such that outside air flows through the image generator 200 and each element in the image generator 200 illustrated in FIG. 2 is efficiently cooled. In other words, the cooling structure is designed as appropriate such that the inside of the image generator 200 becomes a flow passage of outside air. Of course, each element in the image generator 200 may individually has a configuration for, for example, preventing dust from entering the inside of the image generator 200.

Regarding the light source section 100, the cooling structure is configured such that outside air is efficiently blown to the heat sink 12. On the other hand, the cooling structure is configured such that outside air is not blown to a space situated on the front side of the light source section 100. In other words, in the present embodiment, the entrance of outside air into the space situated on the front side of the light source section 100 is restricted.

Here, a region F1, a region F2, and a region F3 are compared with one another, where, as illustrated in FIG. 2, the region F1 is situated inside the image generator 200, the region F2 is situated on the rear side of the light source section 100 and is a region in which the heat sink 12 is situated, and the region F3 is situated on the front side of the light source section 100. In the present embodiment, the region F1 situated inside the image generator 200 and the region F2 situated on the rear side of the light source section 100 are regions that are relatively greatly influenced by dust. On the other hand, the region F1 situated on the front side of the light source section 100 is a region that is relatively less influenced by dust.

The region greatly influenced by dust is typically a region in which there exists a large amount of dust. For example, a region provided in a flow passage of outside air intaken from the inlet 452, and a region provided near the flow passage of the outside air are regions greatly influenced by dust.

The region less influenced by dust is typically a region in which there exists a small amount of dust. For example, a region provided at a position away from the flow passage of the outside air, and a region provided in a hermetically sealed space, or in a space into which the entrance of the outside air is restricted are regions less influenced by dust.

It is possible to set any region in the image display apparatus 500 to be a region greatly influenced by dust or to be a region less influenced by dust by, for example, designing, as appropriate, the cooling structure situated inside the image display apparatus 500.

Regarding regions in the image display apparatus 500 that are different from each other, a region relatively greatly influenced by dust is hereinafter referred to as a first region. Further, a region relatively less influenced by dust is hereinafter referred to as a second region. Naturally, the second region is less influenced by dust than the first region.

Typically, a region in the image display apparatus 500 that is greatly influenced by dust is set to be the first region, and a region in the image display apparatus 500 that is less influenced by dust is set to be the second region. This makes it possible to easily set the first region, and the second region that is less influenced by dust than the first region. The setting is not limited to this, and it is also possible to respectively set two arbitrary regions to be the first and second regions, the two arbitrary regions being regions between which there is a difference in the magnitude of influence of dust.

For example, an arbitrary region in the image display apparatus 500 may be set to be the first region, and a region less influenced by dust than the region set to be the first region may be set to be the second region. Conversely, an arbitrary region in the image display apparatus 500 may be set to be the second region, and a region more influenced by dust than the region set to be the second region may be set to be the first region.

In the present embodiment, the region F1 situated inside the image generator 200 is set to be the first region. Further, the region F3 situated on the front side of the light source section 100 is set to be the second region. The second region can also be set in the hermetically sealed space S1 or S2 illustrated in, for example, FIG. 4.

[Sensor Mechanism]

As illustrated in FIGS. 1 and 2, the first sensor 471 of the sensor mechanism 470 is arranged in the region F1 situated inside the image generator 200. In other words, the first sensor 471 is arranged in the first region relatively greatly influenced by dust.

As illustrated in FIG. 2, in the present embodiment, the first sensor 471 is arranged near a back surface (a surface opposite to a reflective surface) of the dichroic mirror 250 off which red light R1 is reflected. Then, the intensity of leaked light of the red light R1 is detected, the leaked light of the red light R1 being transmitted through the dichroic mirror 250 without being reflected off the dichroic mirror 250. In other words, in the present embodiment, the intensity of red light R1 included in detection-target white light W is detected by the first sensor 471. A result of detection performed by the first sensor may be hereinafter referred to as a first detection result.

As illustrated in FIGS. 1 to 4 and 6, the second sensor 472 is arranged in the region F3 situated on the front side of the light source section 100. In other words, the second sensor 472 is arranged in the second region relatively less influenced by dust.

As illustrated in FIGS. 3, 4, and 6, in the present embodiment, the second sensor 472 is arranged at a position in the region F3 less influenced by dust, the position facing the window 37 formed in the housing 31 of the phosphor unit 30. Further, the intensity of leaked light W' emitted from the window 37 is detected. The leaked light W' is leaked light of white light W including blue laser light B3, green light G3, and red light R3. In other words, in the present embodiment, the intensity of leaked light W' of detection-target white light W is detected by the second sensor 472. A result of detection performed by the second sensor may be hereinafter referred to as a second detection result.

[Control of Brightness to be Constant]

In the present embodiment, brightness is controlled to be constant by the light source control section 491. The control of brightness to be constant is to control the light source section 100 such that the intensity of white light W emitted from the light source section 100 is maintained constant.

Note that, in the present disclosure, "constant" includes "substantially constant" in concept. In other words, "constant" is not limited to being in a fully constant state, and also includes being in a substantially constant state (such as being in a state in which the rate of change is within a range of +/−10%).

In the present embodiment, as the control of brightness to be constant, control of the value of LD current supplied to the plurality of laser light sources 13 is performed according to the first detection result of detection performed by the first sensor 471 and the second detection result of detection performed by the second sensor 472. In other words, brightness is controlled to be constant according to the intensity of red light R1 and the intensity of leaked light W' of white light W.

Figure 7:
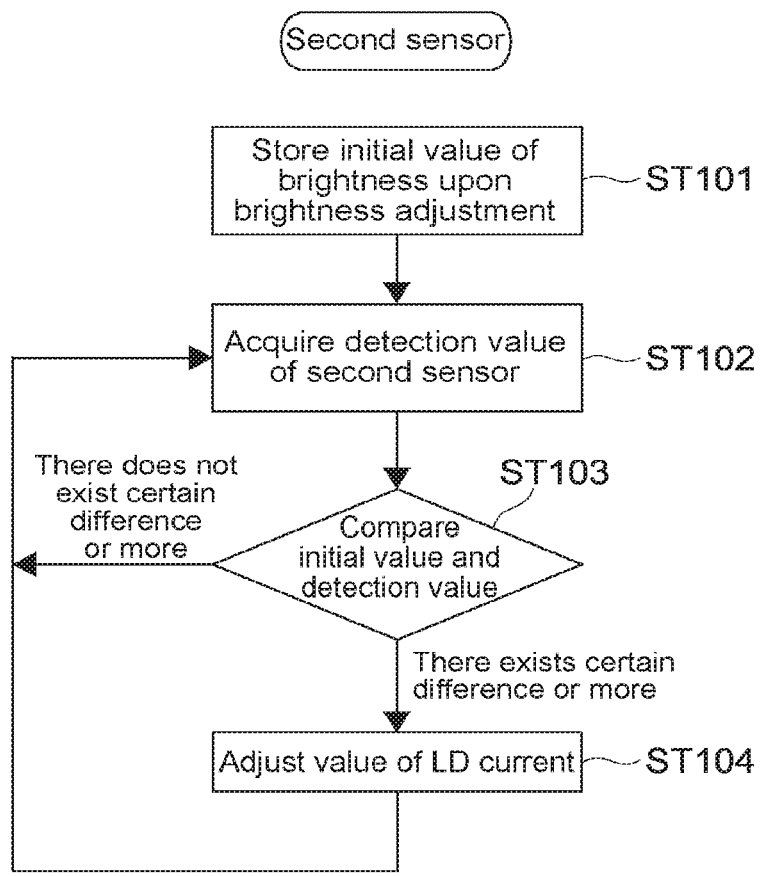
FIG. 7 is a flowchart illustrating an example of control of brightness to be constant performed according to a second detection result.

FIG. 7 is a flowchart illustrating an example of control of brightness to be constant performed according to the second detection result. First, an initial value of brightness upon brightness adjustment is stored in a memory or the like of the controller 490 (Step 101).

For example, brightness is adjusted, for example, when the image display apparatus 500 leaves a factory. For example, the value of LD current is controlled such that an image is displayed at a target brightness. When the image is displayed at the target brightness, the intensity of leaked light W' of white light W is stored in the memory or the like as an initial value of brightness, the intensity of the leaked light W' of the white light W being a detection result detected by the second sensor 472.

Alternatively, brightness may be adjusted by a user. For example, a brightness adjustment mode is selected, and the brightness of an image is controlled using, for example, a button operation. In a state in which the image is displayed at a desired brightness, an operation is input that indicates that the adjustment is completed. The intensity of leaked light W' of white light W is stored in the memory or the like as an initial value of brightness, the intensity of the leaked light W' of the white light W being a detection result detected by the second sensor 472 at this point.

In the present embodiment, the initial value of brightness corresponds to second reference information regarding the second sensor 472. Further, the white light W irradiated when the brightness adjustment is completed corresponds to emitted light in a reference state. Of course, the second reference information is not limited to being generated when brightness is adjusted, and it is possible to generate the second reference information when the white light W in any state is the emitted light in the reference state.

Alternatively, a value of intensity that has been defined in advance may be stored in the memory or the like as the second reference information without brightness adjustment or the like being performed.

A detection value of the second sensor 472 is acquired. In other words, the intensity of the leaked light W' of the white light W is acquired as the second detection result of detection performed by the second sensor 472 (Step 102). The acquired detection value and the initial value stored in the memory or the like are compared (Step 103).

When there exists a certain difference or more between the initial value and the detection value, the value of LD current is adjusted (Step 104). For example, when the detection value is smaller than the initial value, the value of LD current is increased. This results in an increase in the intensity of blue laser light B2 emitted from the plurality of laser light sources 13. When the detection value is larger than the initial value, the value of LD current is decreased. This results in a decrease in the intensity of the blue laser light B2 emitted from the plurality of laser light sources 13. When the control of the value of LD current is completed, the process returns to Step 102.

When there does not exist a certain difference or more between the initial value and the detection value, the value of LD current is not adjusted, and the process returns to Step 102. Brightness is controlled to be constant by repeating a loop of Steps 102, 103, and 104 at specified intervals.

A specific threshold or the like that defines the certain difference or more is not limited, and may be set discretionarily. Further, an amount of increase or decrease of the value of LD current with respect to a difference is also not limited, and may be set discretionarily. For example, the amount of increase or decrease of the value of LD current that is adjusted by performing a single loop may be fixed. Alternatively, the amount of increase or decrease may be controlled as appropriate for each loop depending on the magnitude of difference.

As described above, it is possible to control brightness to be constant according to the second detection result and the second reference information.

Figure 8:
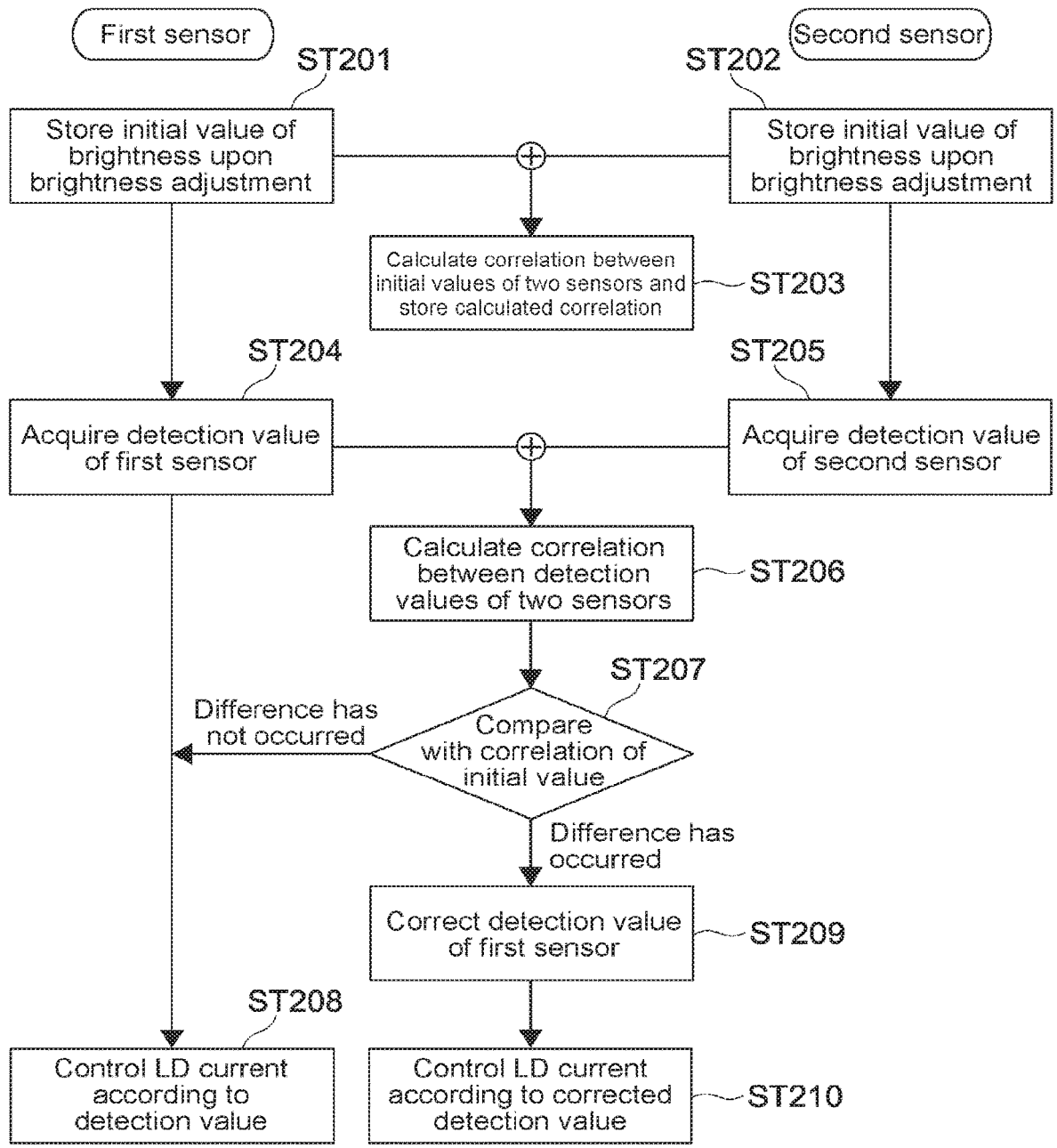
FIG. 8 is a flowchart illustrating an example of the control of brightness to be constant performed according to a first detection result and the second detection result.
Figure 9:
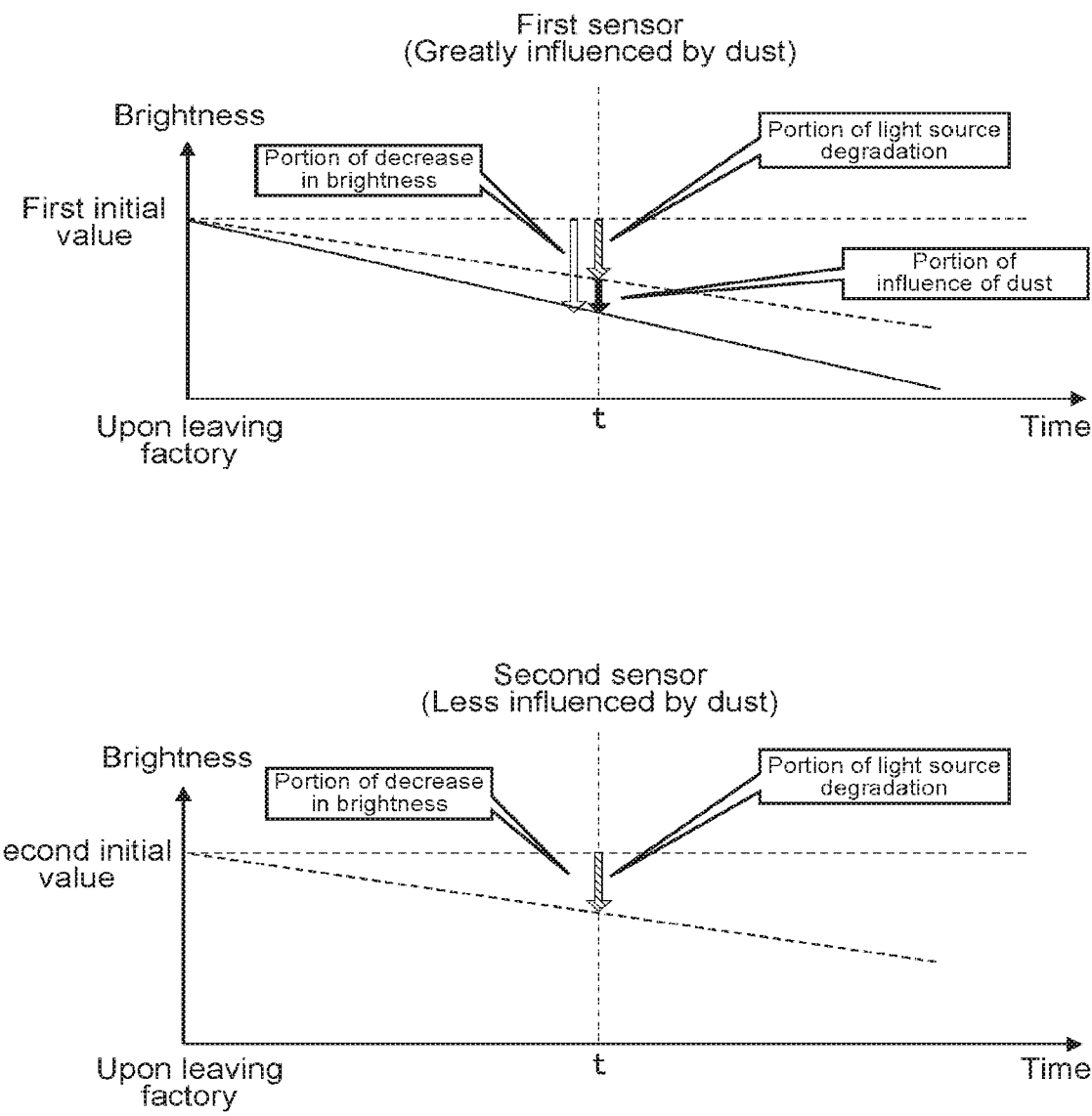
FIG. 9 is a schematic graph describing a basic concept of the control of brightness to be constant performed according to the first detection result and the second detection result.

FIG. 8 is a flowchart illustrating an example of the control of brightness to be constant performed according to the first detection result and the second detection result. FIG. 9 is a schematic graph describing a basic concept of the control of brightness to be constant performed according to the first detection result and the second detection result.

With respect to each of the first and second sensors 471 and 472, an initial value of brightness upon brightness adjustment is stored in a memory or the like of the controller 490 (Steps 201 and 202). In other words, when white light W in a reference state is emitted, the intensity of red light R is stored as an initial value of brightness regarding the first sensor 471 (hereinafter referred to as a first initial value), the intensity of the red light R being a detection result detected by the first sensor 471.

Further, when the white light W in the reference state is emitted, the intensity of leaked light W' of the white light W is stored as an initial value of brightness regarding the second sensor 472 (hereinafter referred to as a second initial value), the intensity of the leaked light W' of the white light W being a detection result detected by the second sensor 472. Typically, the first initial value and the second initial value are acquired at the same timing.

In the example illustrated in FIG. 9, the first and second initial values are respectively acquired when brightness is adjusted upon leaving a factory. Of course, the acquisition of the first and second initial values is not limited to this, and the first and second initial values may be acquired when the white light W in any state is emitted light in the reference state.

The first initial value corresponds to first reference information regarding the first sensor 471. Of course, a value of intensity that has been defined in advance may be stored in the memory or the like as the first reference information.

A basic concept of the control of brightness to be constant performed according to the first detection result and the second detection result, is described with reference to FIG. 9. The second sensor 472 is arranged in the second region less influenced by dust. Thus, a portion of a decrease from the second initial value (a portion of a decrease in brightness) in the detection value of the second sensor 472 corresponds to a portion of light source degradation primarily due to degradation of the laser light source 13 that is caused by aging. Therefore, as illustrated in FIG. 7, it is possible to control brightness to be constant by controlling the value of LD current according to the detection value of the second sensor 472.

On the other hand, the first sensor 471 is arranged in the first region greatly influenced by dust. Thus, a portion of a decrease from the first initial value (a portion of a decrease in brightness) in the detection value of the first sensor 471 may include both a portion of light source degradation due to degradation of the laser light source 13 that is caused by aging, and a portion of influence of dust due to dust attached to the first sensor 471. In the present embodiment, it is possible to accurately control brightness to be constant taking the portion of influence of dust into consideration.

Thus, in the present embodiment, a correlation between the first initial value and the second initial value is calculated and the calculated correlation is stored in the memory or the like (Step 203). Typically, a difference between the first and second initial values is calculated as the correlation between the first and second initial values, and the calculated difference is stored in the memory or the like.

A detection value of the first sensor 471 is acquired. In other words, the intensity of red light R is acquired as the first detection result of detection performed by the first sensor 471 (Step 204). Further, a detection value of the second sensor 472 is acquired. In other words, the intensity of leaked light W' of white light W is acquired as the second detection result of detection performed by the second sensor 472 (Step 205).

A correlation between the acquired first and second detection values is calculated (Step 206). Typically, a calculation similar to the calculation of a correlation in Step 203 is performed, and a difference between the first and second detection values is calculated in the present embodiment.

The correlation between the first and second initial values that is stored in Step 203, and the correlation between the first and second detection values that is calculated in Step 206 are compared (Step 207). The difference between the first and second initial values and the difference between the first and second detection values are compared in the present embodiment.

When there is no difference between the difference between the first and second initial values, and the difference between the first and second detection values, this corresponds to a state in which a portion of a decrease from an initial value in a detection value of the first sensor 471 and a portion of a decrease from an initial value in a detection value of the second sensor 472 are substantially the same as each other. Thus, in this case, it can be determined that, with respect to the first sensor 471, a portion of a decrease in brightness in the detection value corresponds to a portion of degradation of the laser light source 13 that is caused by aging, as in the case of the second sensor 472.

Thus, the LD current is controlled according to the detection value of the first sensor 471 (Step 208). Specifically, the loop of Steps 102, 103, and 104 illustrated in FIG. 7 is performed according to the detection value of the first sensor 471 and the first initial value.

When there is a difference between the difference between the first and second initial values, and the difference between the first and second detection values, this corresponds to a state in which the portion of a decrease from the initial value in the detection value of the first sensor 471 and the portion of a decrease from the initial value in the detection value of the second sensor 472 are different from each other. In this case, it can be determined that, with respect to the first sensor 471, a portion of a decrease in brightness in the detection value includes a portion of influence of dust.

In this case, the detection value of the first sensor 471 is corrected (Step 209). Typically, the detection value of the first sensor 471 is corrected such that the correlation between the first and second initial values is maintained. In other words, the detection value of the first sensor 471 is corrected such that the difference between the first and second detection values is substantially the same as the difference between the first and second initial values.

Then, the LD current is controlled according to the corrected detection value. Specifically, the loop of Steps 102, 103, and 104 illustrated in FIG. 7 is performed according to the corrected detection value of the first sensor 471 and the first initial value.

As described above, in the present embodiment, the correlation between the first and second initial values that is stored in Step 203, and the correlation between the first and second detection values that is calculated in Step 206 are compared. This makes it possible to determine whether a portion of a decrease in brightness includes a portion of influence of dust in a detection value of the first sensor 471 arranged in the first region greatly influenced by dust. This results in being able to accurately control brightness to be constant depending on a portion of light source degradation, the portion of light source degradation being a portion other than a portion of influence of dust.

In the present embodiment, the control of brightness to be constant illustrated in FIG. 8 corresponds to control of the light source section performed according to the first detection result of detection performed by the first sensor 471, the second detection result of detection performed by the second sensor 472, stored first reference information, and stored second reference information.

Note that a method for calculating a correlation between the first and second initial values, a method for calculating a correlation between the first and second detection results, a method for correcting the first detection result, and the like are not limited, and any algorithm, any function, or the like may be used. Further, a method for extracting a portion of light source degradation by removing a portion of influence of dust from the first detection result according to the first detection result and the second detection result, is also not limited, the first detection result being detected in a region greatly influenced by dust, the second detection result being detected in a region less influenced by dust.

For example, any machine learning algorithm using, for example, a deep neural network (DNN) may be used. For example, the use of artificial intelligence (AI) or the like that performs deep learning makes it possible to improve the accuracy in control of brightness to be constant.

Further, the graph illustrated in FIG. 9 is a schematic graph. For example, a decrease in brightness and the like due to degradation of an element in the light source are not limited to a linear decrease. For example, the decrease in brightness may occur in various manners according to the characteristics, a temperature, or the like of the light source.

As described above, in the image display apparatus 500 according to the present embodiment, the first sensor 471 is arranged in the first region, and the second sensor 472 is arranged in the second region less influenced by dust than the first region. It is possible to accurately control the light source section 100 using respective detection results of the first and second sensors 471 and 472.

When a brightness sensor or the like is installed in a region greatly influenced by dust, the detection value may be made smaller due to, for example, attachment of dust if light at the same brightness is received. If a detection value that is smaller than the actual detection value is fed back, the value of LD current will be overcorrected in order to increase brightness more than necessary, and this may result in an early degradation of the LD, breakage of the LD, or the like. This results in shortening the device life and in decreasing the device quality.

In the present embodiment, it is possible to correct a detection result of the first sensor 471 arranged in a region greatly influenced by dust, using the first and second detection results and the first and second initial values. This results in being able to accurately control brightness to be constant according to a portion of light source degradation, the portion of light source degradation being a portion other than a portion of influence of dust.

For example, it is also possible to perform primarily the control of brightness to be constant illustrated in FIG. 7, and to perform, as necessary, the control of brightness to be constant illustrated in FIG. 8. Alternatively, it is also possible to calculate both a value of LD current that is calculated in the control of brightness to be constant illustrated in FIG. 7, and a value of LD current that is calculated in the control of brightness to be constant illustrated in FIG. 8, and to calculate a value of LD current to be actually supplied.

In the present embodiment, the intensity of red light R1 is detected by the first sensor 471, and the intensity of leaked light W' of white light W is detected by the second sensor 472. The configuration is not limited to this.

For example, the entrance of outside air into a region in which the integrator optical system 210 illustrated in FIG. 1 is arranged is restricted, and the region is set to be the second region less influenced by dust. The second sensor 472 may be arranged in the region to detect the intensity of leaked light or the like of white light W emitted from the polarization conversion element 212.

Further, the first sensor 471 may be arranged on the side of a back surface of the dichroic mirror 270, where the inside of the image generator 200 is a region greatly influenced by dust. Then, the intensity of blue light B1 may be detected by the first sensor 471. Note that the change in the intensity of red light R1 can be more accurately detected.

When the amount of dust differs depending on regions inside a region greatly influenced by dust, it is also possible to set, to be the first region, a region in which there exists a large amount of dust, and to set, to be the second region, a region in which there exists a small amount of dust. Then, it is possible to perform the control of brightness to be constant according to the present technology, as illustrated in, for example, FIG. 8. In this case, the first and second detection results may respectively include a portion of influence of dust. However, it is possible to suppress, for example, overcorrection of a value of LD current, compared to the case of controlling brightness to be constant only using a detection result detected in the first region in which there exists a large amount of dust.

Further, when the amount of dust differs depending on regions inside a region less influenced by dust, it is also possible to set, to be the first region, a region in which there exists a large amount of dust, and to set, to be the second region, a region in which there exists a small amount of dust.

OTHER EMBODIMENTS

The present technology is not limited to the embodiments described above, and may achieve other various embodiments.

In the descriptions above, the intensity (brightness) of emitted light is detected as a state of the emitted light. Then, the control of brightness to be constant is performed as control of the light source section that is performed according to the first and second detection results. The configuration is not limited to this, and other parameters such as chromaticity and the shape of a pencil of light (including the size (the area of a cross section) of the pencil of light) may be detected as the state of the emitted light. Further, control of chromaticity, control of a pencil of light, and the like may be performed as the control of the light source section.

Even when a sensor (the first sensor) is arranged in a region greatly influenced by dust, it is possible to accurately control the light source section using a detection result of a sensor (the second sensor) arranged in a region less influenced by dust. Of course, it is sufficient if a sensor (such as a chromaticity sensor) corresponding to a parameter desired to be acquired as a state of the light source is used.

It may be possible to perform processing including monitoring whether the intensity of emitted light emitted from the light source section is greater than a defined value defined in a safety standard or the like, and stopping the supply of the value of LD current when the intensity of the emitted light is greater than the defined value. In this case, the application of the present technology makes it possible to detect the intensity of the emitted light in which a portion of influence of dust has been excluded), and thus it is possible to maintain a very high level of safety in use.

Dust information regarding dust may be generated using the first detection result of detection performed by the first sensor, the second detection result of detection performed by the second sensor, the stored first reference information, and the stored second reference information. For example, it is possible to generate the magnitude of influence or the like of dust in the image display apparatus as the dust information. It is also possible to notify, according to the dust information, a user of, for example, information regarding a usage state of the device and information regarding a usage environment of the device.

The respective configurations of the image display apparatus, the light source section, the image generator, the projection section, and the like; the flows of controlling the light source section; and the like that have been described with reference to the respective figures are merely examples, and any modifications may be made thereto without departing from the spirit of the present technology. In other words, any other configuration, any other algorithm, and the like for carrying out the present technology may be adopted.

Further, at least two of the features according to the present technology described above can also be combined discretionarily. In other words, various features described in the respective embodiments may be combined discretionarily regardless of the embodiments. Further, the various effects described above are not limitative but are merely illustrative, and other effects may be provided.

Note that the present technology may also take the following configurations.

(1) An image display apparatus including:

a light source section that emits emitted light;

a first sensor that is arranged in a first region and is capable of detecting a state of the emitted light;

a second sensor that is arranged in a second region and is capable of detecting the state of the emitted light, the second region being less influenced by dust than the first region; and a light source control section that is capable of controlling the light source section according to a first detection result of detection performed by the first sensor, and a second detection result of detection performed by the second sensor.

(2) The image display apparatus according to (1), in which the second region is a region in which an amount of dust is smaller than an amount of dust in the first region.

(3) The image display apparatus according to (1) or (2), further including a housing that includes an inlet used to intake outside air, in which
the first region is provided in a flow passage of the outside air intaken from the inlet, or near the flow passage of the outside air, and
the second region is provided at a position away from the flow passage of the outside air.

(4) The image display apparatus according to any one of (1) to (3), in which
the second region is provided in a hermetically sealed space, or in a space into which entrance of the outside air is restricted.

(5) The image display apparatus according to any one of (1) to (4), in which
the light source control section controls the light source section such that intensity of the emitted light emitted from the light source section is maintained constant.

(6) The image display apparatus according to any one of (1) to (5), in which
the light source section includes at least one light source that is driven by being supplied with current, and
according to the first detection result and the second detection result, the light source control section controls the current supplied to the at least one light source.

(7) The image display apparatus according to any one of (1) to (6), further including a storage that stores therein first reference information regarding the first sensor and second reference information regarding the second sensor, in which
the light source control section controls the light source section according to the first detection result, the second detection result, the stored first reference information, and the stored second reference information.

(8) The image display apparatus according to (7), in which
the light source control section controls the light source section according to a correlation between the first reference information and the second reference information, and a correlation between the first detection result and the second detection result.

(9) The image display apparatus according to (7) or (8), in which
the first reference information is a detection result detected by the first sensor when the emitted light in a reference state is emitted, and
the second reference information is a detection result detected by the second sensor when the emitted light in the reference state is emitted.

(10) The image display apparatus according to any one of (7) to (9), in which
the light source control section corrects the first detection result according to the first detection result, the second detection result, the stored first reference information, and the stored second reference information.

(11) The image display apparatus according to (10), in which
the light source section includes at least one light source that is driven by being supplied with current, and
according to the corrected first detection result, the light source control section controls the current supplied to the at least one light source.

(12) The image display apparatus according to any one of (1) to (11), in which
the light source section includes at least one light source that is driven by being supplied with current, and
according to the second detection result, the light source control section controls the current supplied to the at least one light source.

(13) The image display apparatus according to any one of (1) to (12), in which
the light source section
includes at least one light source and a light emitter, the light emitter being excited by light emitted from the at least one light source and emitting visible light, and
emits, as the emitted light, light that includes the light from the at least one light source and the visible light from the light emitter.

(14) The image display apparatus according to (13), in which
the light source section includes a hermetically sealed portion that includes a window and has a hermetically sealed space formed inside the hermetically sealed portion,
the light emitter is arranged in the hermetically sealed space, and
the second sensor is arranged to face the window of the hermetically sealed portion.

(15) The image display apparatus according to any one of (1) to (14), further including:
an image generator that generates an image using the emitted light emitted from the light source section; and
a projection section that projects the image generated by the image generator.

REFERENCE SIGNS LIST

B2 blue laser light
F1 region situated inside image generator
F3 region situated on front side of light source section
R1 red light
W white light
W' leaked light of white light
13 laser light source
31 housing
37 window
38 phosphor wheel
42 phosphor layer
100 light source section
200 image generator
400 projection section
450 housing
452 inlet
453 outlet
470 sensor mechanism
471 first sensor
472 second sensor
490 controller
491 light source control section
500 image display apparatus

The invention claimed is:
1. An image display apparatus comprising: a light source that emits emitted light; a first sensor that is arranged in a first region and is configured to detect a state of the emitted light, the first region being located in a flow passage of outside air within a housing; a second sensor that is arranged in a second region and is configured to detect the state of the emitted light, the second region being located away from the flow passage of the outside air and a light source controller that is configured to control the light source according to a first detection result of detection performed by the first sensor, and a second detection result of detection performed by the second sensor.

2. The image display apparatus according to claim 1, wherein
the second region is a region in which an amount of dust is smaller than an amount of dust in the first region.

3. The image display apparatus according to claim 1, further comprising the housing, which includes an inlet used to intake the outside air, wherein the first region is provided in the flow passage of the outside air taken in through the inlet.

4. The image display apparatus according to claim 1, wherein
the light source controller is configured to control the light source such that intensity of the emitted light emitted from the light source is maintained constant.

5. The image display apparatus according to claim 1, wherein
the light source includes at least one light source that is driven by being supplied with current, and
according to the first detection result and the second detection result, the light source controller controls the current supplied to the at least one light source.

6. The image display apparatus according to claim 1, further comprising a storage that stores therein first reference information regarding the first sensor and second reference information regarding the second sensor, wherein
the light source controller is configured to control the light source according to the first detection result, the second detection result, the stored first reference information, and the stored second reference information.

7. The image display apparatus according to claim 6, wherein
the first reference information is a detection result detected by the first sensor when the emitted light in a reference state is emitted, and
the second reference information is a detection result detected by the second sensor when the emitted light in the reference state is emitted.

8. The image display apparatus according to claim 6, wherein
the light source controller is configured to correct the first detection result according to the first detection result, the second detection result, the stored first reference information, and the stored second reference information.

9. The image display apparatus according to claim 8, wherein
the light source includes at least one light source that is driven by being supplied with current, and
according to the corrected first detection result, the light source controller is configured to control the current supplied to the at least one light source.

10. The image display apparatus according to claim 1, wherein
the light source includes at least one light source that is driven by being supplied with current, and
according to the second detection result, the light source controller is configured to control the current supplied to the at least one light source.

11. The image display apparatus according to claim 1, wherein
the light source
includes at least one light source and a light emitter, the light emitter being excited by light emitted from the at least one light source and emitting visible light, and
emits, as the emitted light, light that includes the light from the at least one light source and the visible light from the light emitter.

12. The image display apparatus according to claim 11, wherein
the light source includes a hermetically sealed portion that includes a window and has a hermetically sealed space formed inside the hermetically sealed portion,
the light emitter is arranged in the hermetically sealed space, and
the second sensor is arranged to face the window of the hermetically sealed portion.

13. The image display apparatus according to claim 1, further comprising:
an image generator that generates an image using the emitted light emitted from the light source; and
a projection section that projects the image generated by the image generator.

14. An image display apparatus, wherein comprising: a light source that emits emitted light, a first sensor that is arranged in a first region and is configured to detect a state of the emitted light, a second sensor that is arranged in a second region and is configured to detect the state of the emitted light: and a light source controller that is configured to control the light source according to a first detection result of detection performed by the first sensor, and a second detection result of detection performed by the second sensor, wherein the second region is provided in a hermetically sealed space.

15. An image display apparatus comprising:
a light source that emits emitted light;
a first sensor that is arranged in a first region and is configured to detect a state of the emitted light:
a second sensor that is arranged in a second region and is configured to detect the state of the emitted light: and
a light source controller that is configured to control the light source according to a first detection result of detection performed by the first sensor, and a second detection result of detection performed by the second sensor, wherein
the light source controller is configured to control the light source according to a correlation between the first detection result and the second detection result.

* * * * *